United States Patent [19]

Eckels

[11] Patent Number: 4,779,017
[45] Date of Patent: Oct. 18, 1988

[54] SUPERCONDUCTING ROTOR COOLING SYSTEM

[75] Inventor: Phillip W. Eckels, Pittsburgh, Pa.

[73] Assignee: The United States of America as represented by the Secretary of the Air Force, Washington, D.C.

[21] Appl. No.: 107,197

[22] Filed: Oct. 13, 1987

[51] Int. Cl.⁴ .................... H02K 9/197; H02K 9/00
[52] U.S. Cl. ..................................... 310/52; 310/58; 310/61; 310/10; 416/179
[58] Field of Search ............... 310/52, 54, 58, 61, 310/62, 63, 10, 40 R; 417/355, 356, 366, 368, 370, 371, 372; 416/179, 189

[56] References Cited

U.S. PATENT DOCUMENTS

| | | | |
|---|---|---|---|
| 3,713,305 | 1/1973 | Staas et al. | 62/500 |
| 4,048,529 | 9/1977 | Pomeroy et al. | 310/54 |
| 4,228,662 | 10/1980 | Klipping | 62/216 |
| 4,291,541 | 9/1981 | Kneip, Jr. et al. | 62/45 |
| 4,380,712 | 4/1983 | Intichar et al. | 310/52 |

FOREIGN PATENT DOCUMENTS 2025707A 1/1980 United Kingdom ............... 310/52

Primary Examiner—Mark O. Budd
Assistant Examiner—Judson H. Jones
Attorney, Agent, or Firm—Richard J. Donahue; Donald J. Singer

[57] ABSTRACT

A superconducting rotor cooling system for an electrical generator includes a free vortex type pump which is located within and forms an integral part of the rotor assembly. The free vortex pump takes advantage of the centrifugal force of rotation of the cooling fluid to help the rotor winding compartment to remain in a superfluid helium state. Improved cooling results from combined natural convection, as occurs in a conventional rotor, and the superfluid heat transport which occurs at the velocity of sound.

6 Claims, 1 Drawing Sheet

SUPERCONDUCTING ROTOR COOLING SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to electrical generators employing superconducting rotors, and more particularly to a cooling system for supplying coolant at superfluid temperatures to a superconducting rotor.

In electrical generators having superconducting rotors, the windings on the rotor are immersed in a pool of very cold liquified gas, such as liquid helium. The liquid helium absorbs heat from the windings and consequently evaporates to its gaseous (vaporous) form. The rotor winding pool is in flow communication with a source of helium and to a pump which delivers liquid helium to the pool at a very low pressure, and hence at a superfluid temperature. Because of the very low pressure, air may be drawn into the rotating transfer system. When this occurs, the air freezes and can plug the cooling system and disrupt the proper operation of the system.

Superfluid helium is often produced and maintained by vacuum pumping liquid helium to low pressure inside a dewar. Minimization of heat leaks is important because the vacuum pumps that produce the low pressure over the superfluid are operated at room temperature and become physically very large in order to pump significant quantities of low pressure, high specific volume helium vapor.

Applicant has recognized that if a rotor cooling system could be implemented with a vacuum pump that would operate reliably with very low temperature helium, then the pump could be integrated within the rotor and thereby eliminate external pump connections and their inherent air leak problems. Also, at low temperature the specific volume of helium vapor is much smaller and the pump and associated piping could be made much smaller. However, reliable operation of the moving parts of conventional pumps at such low temperatures of liquid helium has not been accomplished with any acceptable degree of reliability.

OBJECTS AND SUMMARY OF THE INVENTION

It is therefore the primary object of the present invention to provide a novel superfluid cooling system for electrical generators.

It is an important feature of the superfluid cooling system of the present invention that it includes a form of free vortex pump integrated with the superconducting rotor of an electric generator.

In accordance with the superfluid cooling system of the present invention, a vortex vacuum pump and associated diffuser are included within the rotor of the generator. The pump produces a low enough pressure within the rotor to pump the liquid helium to its superfluid state. Low pressures are achieved by channeling helium gas boiled-off by structural heat inward to a small radius. The helium which is spinning at rotor speed at the larger pool radius forms a vortex due to conservation of angular momentum as it spins inward. Thus a pumping action is produced by controlling the fluid angular momentum as it changes radius en route from within the rotor.

The foregoing and other objects, advantages and features of the present invention will become apparent from the following detailed description of the preferred embodiment thereof, as illustrated in the accompanying drawings.

DETAILED DESCRIPTION OF THE INVENTION

Figure 1:
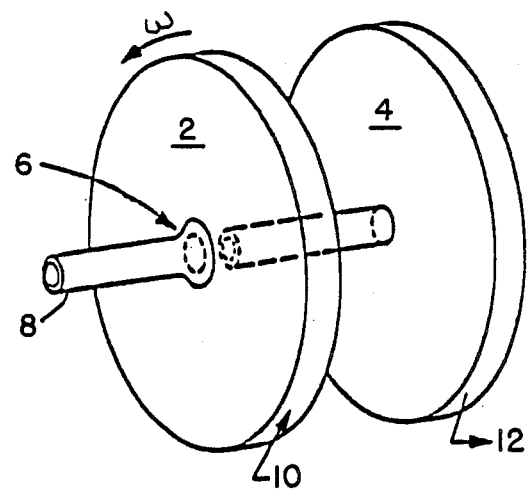
FIG. 1 is a simplified pictorial diagram which illustrates the basic structure of the free vortex pump used in the preferred embodiment of the present invention.

As seen in the simplified diagram of FIG. 1, the helium coolant flow pump to be used within the superconducting rotor of the present invention is a free vortex type pump which includes a vortex chamber 2 and a diffuser or static pressure chamber 4. Low pressure helium vapor enters the eye 6 of the vortex chamber 2 via tube 8, while helium vapor rotating at the velocity w (of the associated rotor) enters vortex chamber 2 at the circular periphery or rim 10 thereof.

The high velocity helium vapor which enters the peripheral rim 10 of vortex chamber 2 flows towards the eye 6 of the vortex. As it moves radially inward, conservation of angular momentum causes the velocity of the vapor to increase and, by the Bernoulli energy relation, its pressure decreases. This basic operation of a free vortex chamber is known in fluidics and cyclone dust separators.

As the helium drops in pressure, its specific volume increases and liquid is condensed. At the eye 6 of the vortex, the fluid velocity is high and the pressure is low. The velocity energy is then converted to pressure energy in an associated diffuser chamber 4. High pressure helium is extracted from the rim 12 of diffuser chamber 4.

Figure 2:
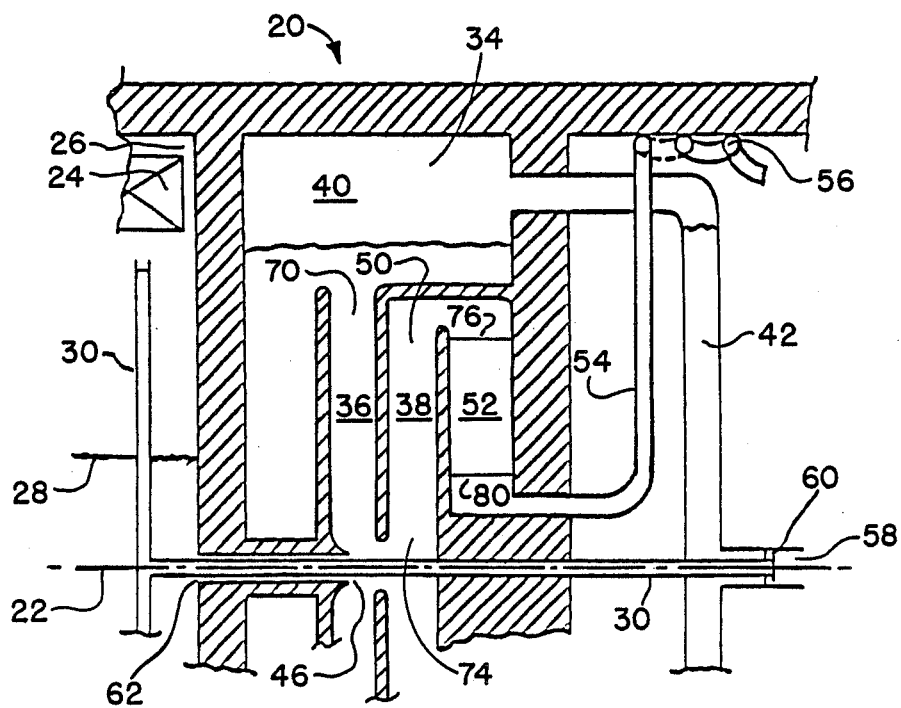
FIG. 2 is a cross-sectional view of that portion of the superconducting rotor of an electric generator having the integrated free vortex vacuum pump chamber, diffuser chamber and associated coolant flow channels of the present invention.

FIG. 2 is a drawing of the portion of a superconducting rotor assembly which includes a vortex pump and diffuser which function as described above and form an integral part of the rotor cooling system of the present invention.

Rotor assembly 20 of FIG. 2 rotates about the rotational axis depicted by line 22. A rotor winding 24 is positioned in the winding volume compartment 26, and is immersed in superfluid liquid helium at superfluid pressure. The centrifugal action of the rotor establishes a liquid-vapor level 28 in compartment 26. Helium is supplied to this compartment via inlet tube 30 and the liquid-vapor level 28 is regulated by virtue of the static liquid pressure differences in compartment 26 and inlet tube 30.

An adjacent compartment 34 formed within rotor assembly 20 houses the vortex pump chamber 36 and the diffuser chamber 38 of the present invention. A pool 40 of liquid helium is supplied to compartment 34 via inlet pipe 42. Pool 40 of liquid helium rotates about the rotational center line 22 at the same angular velocity w as the rest of the rotor assembly.

Vortex chamber 36 has a low pressure vortex eye 46 while diffuser chamber 38 has an outlet 50 which enters radial vane chamber 52. The radial vanes in chamber 52 serve to control any overspin of the fluid subsequently entering outlet pipe 54. Outlet pipe 54, in turn, provides a source of atmospheric pressure helium to torque tubes 56 of the rotor assembly. A helium inlet 58 having a liquid trap 60 provides helium to the winding volume compartment 26 via tube 30, while the space 62 between tube 30 and the wall of winding volume compartment 26 provides a flow path for low pressure helium from winding compartment 26 to the eye 46 of the vortex pump.

In operation, helium boiled-off from the liquid helium pool 40 enters the vortex chamber 36 at location 70 thereof and spirals inwardly to the eye 46 of vortex chamber 36. Momentum of the vapor is conserved in vortex chamber 36 and therefore it becomes possible to develop over one atmosphere pressure drop at the eye 46 thereof.

Vortex chamber 36 is also coupled for fluid transfer from the rotor winding compartment 26 by the space 62 surrounding tube 30. Therefore, helium vapor from rotor compartment 26 is entrained in the vortex flow and reduces the pressure and temperature within rotor winding compartment 26. The low pressure helium flow proceeds from ey 46 of vortex chamber 36 into radial diffuser chamber 38 at its fluid entrance location 74.

As previously mentioned, angular momentum of the helium vapor is conserved in diffuser chamber 38. Pressure recovery occurs as the fluid moves outward in the radius of diffuser chamber 38 to the inlet 76 of radial vane chamber 52. Here, fixed radial vanes control the over-spin of the fluid so that the system receives fluid without excessive pre-whirl at its outlet 80. Atmospheric pressure helium is now available for supplying torque tubes 56 of the rotor assembly.

The helium flow passages shown and described herein are preferrably variable in size and appropriately inclined to the radius to handle condensate from the expanding saturated fluid and helium gas densities.

The superfluid cooling system described herein avoids the necessity for having a large pump by performing its pumping operation at low temperature where the helium vapor specific volume is small. Moreoever the integration of the vortex pump into the rotor assembly intercepts the structural and power lead heat leaks of conventional cooling systems and this boil-off is used to advantage in operating the vortex pump. The production of very low pressure takes place completely removed from the air environment thus eliminating many potential leak problems.

While the invention has been described with reference to a particular embodiment thereof, it will be understood by those skilled in the art that the invention is capable of a variety of alternative embodiments that come within the spirit and scope of the appended claims.

What is claimed is:

1. A superfluid cooling system for cooling the superconductive rotor of an electric machine, said system comprising:

a superconductive rotor having a first compartment and a second compartment, said first compartment containing a winding of said rotor and cooling fluid for said winding, and having a cooling fluid inlet and a vaporous cooling fluid outlet, said second compartment being adjacent said first compartment and having a vaporous cooling fluid inlet coupled to said vaporous cooling fluid outlet of said first compartment, and having a liquid cooing fluid return inlet, and a cooling fluid outlet, said second compartment housing a free vortex pump having a cylindrical vortex chamber with a vortex opening eye at the center thereof, said free vortex pump having said vortex eye coupled to said vaporous cooling fluid inlet of said second compartment and receiving at its periphery vaporous cooling fluid contained within said second compartment, and having an outlet coupled by fluid coupling means to said cooling fluid outlet of said second compartment.

2. A superfluid cooling system in accordance with claim 1 wherein said fluid coupling means comprises a diffuser chamber coupled between said outlet of said free vortex pump and said cooling fluid outlet of said second compartment.

3. A superfluid cooling system in accordance with claim 2 wherein said fluid coupling means further comprises a fluid overspin control chamber having radial fins therein coupled between said diffuser chamber and said cooling fluid outlet of said second compartment.

4. A superfluid cooling system in accordance with claim 3 wherein said cooling fluid inlet of said first compartment comprises an inlet tube concentric with and extending through said eye of said free vortex pump.

5. A superfluid cooling system in accordance with claim 4 wherein said cooling fluid outlet of said second compartment is coupled to torque tubes within said superconductive rotor.

6. A superfluid cooling system in accordance with claim 5 wherein said cooling fluid is helium.

* * * * *